United States Patent [19]
Schmidt

[11] 3,758,781
[45] Sept. 11, 1973

[54] RADIATION AND PARTICLE DETECTOR AND AMPLIFIER

[75] Inventor: Kenneth C. Schmidt, Livonia, Mich., granted to the United States National Aeronautics and Space Administration under the provisions of 42 U.S.C. 2457

[22] Filed: July 15, 1969

[21] Appl. No.: 841,845

[52] U.S. Cl. ............. 250/207, 250/83.3 R, 313/104
[51] Int. Cl. .............................................. G01t 1/16
[58] Field of Search ..................... 250/83, 83.3, 207, 250/105; 313/103, 104, 105, 102; 325/243

[56] References Cited
UNITED STATES PATENTS

| | | | |
|---|---|---|---|
| 2,161,859 | 6/1939 | Geffcken et al. | 313/102 X |
| 3,028,493 | 4/1962 | Takahashi | 250/83.3 X |
| 3,176,178 | 3/1965 | Goodrich et al. | 313/104 |
| 3,413,479 | 11/1968 | Hendee | 250/207 |

*Primary Examiner*—James W. Lawrence
*Assistant Examiner*—Davis L. Willis
*Attorney*—Leonard Rawicz, Neil B. Siegel and Paul F. McCaul

[57] ABSTRACT

A radiation or charged particle detector which incorporates a channel multiplier structure to amplify the detected rays or particles, the channel multiplier structure having a support multiplying element, the element having a longitudinal slot formed along one side thereof, the element supporting a pair of plates positioned contiguous with the slot, the plates being adapted to funnel the particles or rays to be detected into the slotted aperture and ultimately the element, thus creating an effectively wide aperture detector of the windowless type.

11 Claims, 5 Drawing Figures

PATENTED SEP 11 1973 3,758,781
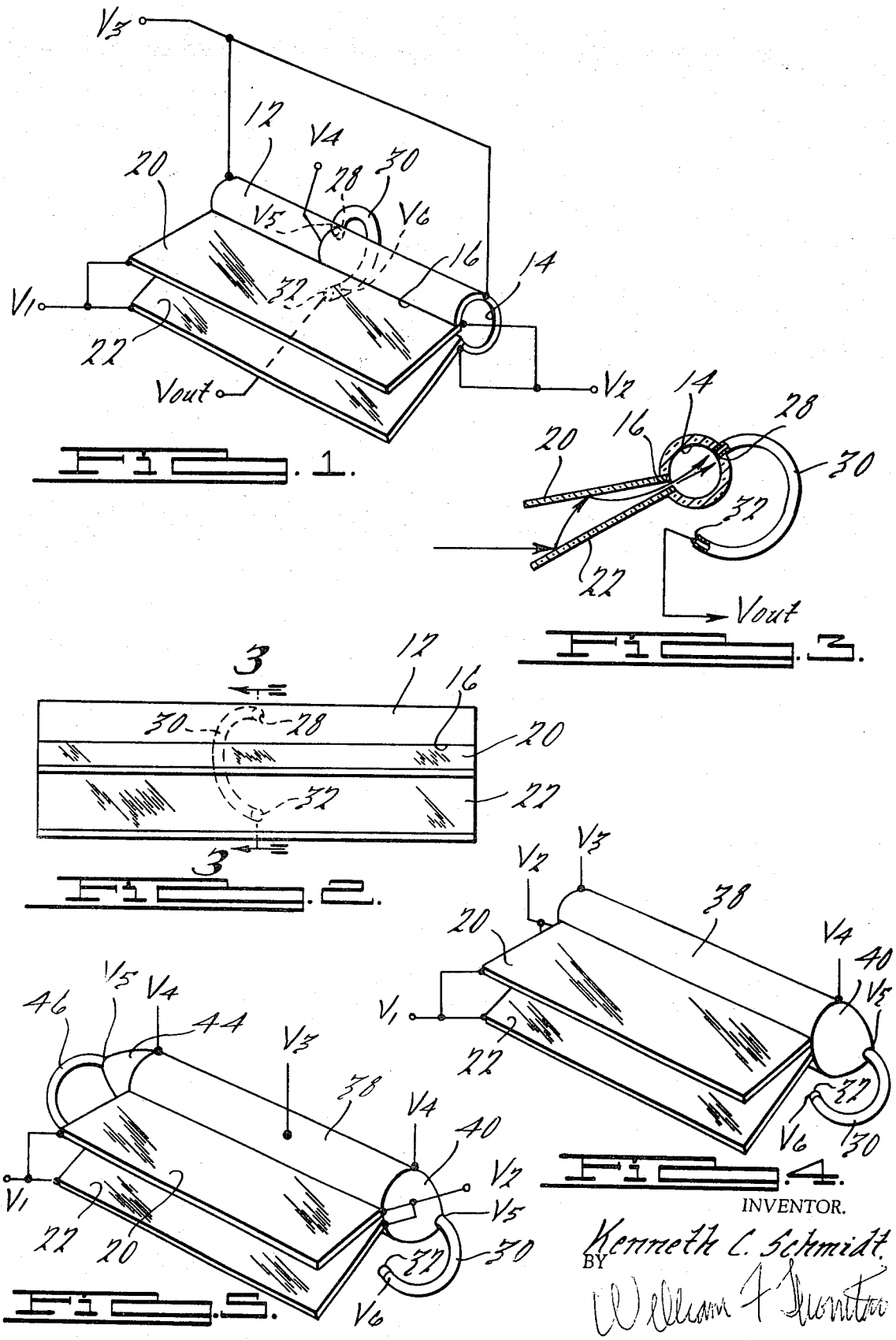
INVENTOR.
Kenneth L. Schmidt
BY
William F. Thurston
ATTORNEY.

RADIATION AND PARTICLE DETECTOR AND AMPLIFIER

The invention described herein was made in the performance of work under a NASA contract and is subject to the provisions of Section 305 of the National Aeronautics and Space Act of 1958, Public Law 85-[2 Stat. 435, 42 U.S.C. 2457].

BACKGROUND AND SUMMARY OF THE DEVELOPMENT

This invention relates generally to a radiation or charged particle detector and amplifier, and more particularly to a detector and amplifier for detecting an amplifying radiation such as x-rays and ultraviolet rays, and charged particles, which detection occurs along an elongated area of relatively wide angle.

Certain applications of electron multipliers have been found which require detection and amplification of lines of radiation or rectangular areas of radiation. This requirement for a detection and amplification system has been heretofore met through the use of an arrangement of a column of electron multipliers of the type disclosed in U.S. Pat. No. 3,128,408, to Messrs. Goodrich and Wiley, entitled "Electron Multiplier." In an assembly of this type, the input ends of the column of multipliers are placed in a line to receive the line or area of radiation. This practice, while providing the detection and amplification required, created certain difficulties in providing uniformity of response. For example, the gain from each of the channels must be made uniform so that, for a given input, all of the channels povided approximately the same output, irrespective of the position of the input along the line of radiation. Further, an assembly of this type decreased the open area ratio due to the intermediate channel walls within the periphery of the electron multiplier structure.

In accordance with the features of the present invention, an improved channel multiplier device has been evolved which can detect radiation along all points of a relatively wide strip and amplify the radiation to a single signal level regardless of the initial strength of the radiation or location of the radiation along the line. With the system of the present invention, a single channel electron multiplier is utilized to detect and amplify the entire line of radiation, instead of the prior column of matched channels.

The electron multiplier of the present invention incorporates a first and second plate which are formed of high resistance glass similar to that used in other prior art electron multipliers, the plates being arranged so that the spacing between them at their front edge is greater than the spacing between the plates at their back edge. The spacing at the back edge is established by a slot formed in a generally tubular channel multiplier element, the width of the slot being selected in accordance with a pre-established range of ratios of the slot width and the diameter of the main channel multiplier element. The included angle between the plates is determined by the desired angle of incidence of the particle or radiation beam to be detected as well as the desired trajectory for secondary electrons created by the impact of the ray or charge particle beam.

The secondary electrons exit from between the two plates and enter a large slotted electron multiplier where they impact and the energy of impact creates additional secondary electrons. The main multiplier element is fabricated in such a way that electrons impacting along its entire length are accelerated toward either a hole in the central portion of the main multiplier element or toward a pair of funnel elements disposed at either end of the main element. These electrons are extracted from either the hole or the funnel element by means of electric fields created by suitable direct current bias sources. The multiplied electrons then enter the entrance aperture of a conventional curved electron multiplier, where they are multiplied to the desired level.

Accordingly, it is one object of the present invention to provide an improved electron multiplier assembly.

It is another object of the present invention to provide improved electron multiplier assembly which is capable of detecting particles within an elongated area.

It is still another object of the present invention to provide an improved elongated area sensing detector which eliminates the necessity for utilizing a plurality of side-by-side electron multipliers.

It is a further object of the present invention to provide an improved electron multiplier having improved open area ratio characteristics.

It is still another object of the present invention to provide a wide area detector having improved linearity characteristics.

It is still a further object of the present invention to provide improved wide area detector which is inexpensive to manufacture, and reliable in use.

Further objects, features and advantages of this invention will become apparent from a consideration of the following description, the appended claims and the accompanying drawings in which:

FIG. 1 is a perspective view of a wide area particle detector and amplifier incorporating the features of the present invention;

FIG. 2 is a front view of the detector and amplifier of FIG. 1;

FIG. 3 is a sectional view of the detector and amplifier of FIG. 2, taken line 3—3 thereof;

FIG. 4 is another embodiment of the detector and amplifier of FIG. 1; and

FIG. 5 is still another modification of the detector and amplifier of FIG. 1.

FIGS. 1 to 3 illustrate a preferred embodiment of the invention which comprises a main channel electron multiplier element 12 normally having a length to diameter ratio of approximately 50:1. The inside surface 14 of the channel multiplier element 12 is coated with a relatively high resistance and electron emissive coating to establish an electric field within the element 12 and to cause multiplication of the electrons impacting on the interior surface 14 through secondary emission characteristics.

A slot 16 is formed longitudinally of the electron multiplier element 12, the slot being of extremely small transverse dimension and extending from the exterior to the interior of the electron multiplier element 12. The material around the slot 16 is fastened to a pair of glass plate elements, 20, 22, the interior surface of which is also coated with a relatively high resistive and secondary electron emissive coating, as was the case with the interior surface of the main electron multiplier element 12. In the preferred embdiment, one longitudinal edge of each plate 20, 22 is positioned within the slot 16 in the case where the slot is of a diameter to accommodate the thickness of the two plates 20, 22 or, alternatively, the plates 20, 22 may be fixed to the out-side surface of the electron multiplier element 12. In this latter case, the slot 16 will be provided with a conductive and secondary electron emissive coating. Further, while slot 16 is illustrated as having parallel sides, it is to be understood that other slot configurations having non-parallel sides are also possible. The plates 20, 22 are preferably, in one embodiment, approximately 12 centimeters long and the spacing between the plates 20, 22 is approximately 1 centimeter. Thus, the plates are adapted to detect particles within a 12 square centimeter area, this area being completely open and free of channel walls and interstitial spaces.

The central portion of the main element 12 is provided with an aperture 28, the aperture 28 being contiguous with a curved electron multiplier element 30. The output end of the curved element 30 is provided with a collector cap 32 which is utilized to collect the multiplied electrons being transmitted through the electron multiplier element 30. The channel multiplier element 30 is curved to minimize the feed back which may occur under the conditions of amplification when the device is in use. Feed back may be caused by gas molecules in the channel multiplying path which are ionized by the multiplied electrons. The ionized gas molecules, being of a positive charge, are accelerated in the reverse direction toward the input end of the channel multiplier and, if they strike the surface near the input end, they cause substantial additional feed back generated multiplication which would lead to a spurious and continuously operating signal condition if the feed back were not minimized. Further, feed back may also be caused by other means such as light in the case of a photosensitive device, the feed back being generated by secondary emission and by ionization.

The secondary electrons are accelerated toward the electron multiplier element 30 by means of varied voltages which are connected to the elements of the system. For example, voltage $V_1$ is supplied to the input end of the plates 20, 22 and voltage $V_2$, which voltage is positive with respect to $V_1$ and is supplied to the output end of the plates 20, 22. The electrons passing through the slot 16 are accelerated toward the back surface 14 to cause emission of secondary electrons in response to the impact of the secondary electrons from plates 20, 22 or primary electrons directly striking the surface 14. The seconday electrons emitted from the interior surface 14 are drawn toward the central portion of the element 12 by means of the voltage $V_4$. The voltage $V_3$ is positive with respect to the voltage $V_2$, and the voltage $V_4$ is positive with respect to the voltage $V_3$.

The secondary electrons then enter the aperture 28 and electron multiplier 30, the multiplier 30 being supplied with a voltage $V_5$, which is negative with respect to the voltage $V_4$, and a voltage $V_6$, which is positive with respect to $V_5$. The voltage $V_6$ minus $V_5$ is the electron multiplier operating voltage and is generally of the order of 2,500 volts. This voltage provides an electric field in the electron multiplier having field lines which are substantially parallel to the tube axis throughout the length thereof, with the output end being more positive than the input end in order to accelerate electrons toward the output. Also, a voltage, as for example 150 volts, may be supplied to the output plate 32 to collect the electrons being emitted from the electron multiplier 30. In the illustrated embodiment, this voltage is absent and the output signal is sensed directly by means of an output voltage terminal labeled $V_{out}$. However, this voltage normally would be of the order of approximately 150 volts.

The conductive coating on the interior surface 14 is also placed on the walls of the slot to prevent the formation of potential wells, the wells being caused by electrons striking the walls and resulting in secondary emission from the walls. If the walls are insulative, every time a secondary emission occurred, a small positive charge would appear on the wall due to the secondary electron emission. Over a period of time, this emission may result in very high positive voltage on the slot walls, which voltage would distort the field within the multiplier. By placing a conductive coating on the walls thereof, secondary electrons which are lost are quickly resupplied by the potential source connected to the coating.

Referring now to FIG. 4, there is illustrated a modified structure which includes a main multiplier element 38 differing from that described in conjunction with FIGS. 1 to 3 by the fact that the central aperture 28 is absent from the element 38. The secondary electrons emitted from the interior surface of the element 38 are collected by means of a generally funnel-shaped input section 40 which is connected to one end of the electron multiplier element 30. As was the case with FIGS. 1 to 3, the electric field is set up between the plates 20, 22 by means of the voltages $V_1$ and $V_2$, and the secondary electrons emitted from the plates 20, 22 are directed to the interior of the element 38, to impact on the walls thereof, by means of a voltage $V_3$. However, in order to accelerate the secondary electrons to the collector funnel 40, a voltage $V_4$ is provided which is more positive than the voltage $V_3$, as was the case with FIG. 1. However, the voltage $V_4$ is supplied to the opposite end of the element 38 with respect to the voltage $V_3$. As was the case with FIGS. 1 to 3, the electron multiplier operating voltage $V_6$ minus $V_5$ is supplied to element 30.

Referring now to FIG. 5, there is illustrated a further modification of the system of FIGS. 1 to 3 in that a second funnel-shaped element 44 and a second channel multiplier element 46 is utilized. However, in order to properly accelerate the electrons toward each end, and ultimately to the funnel portions 40, 44, the voltage $V_3$ is supplied to a central portion of the element 38 and the voltage $V_4$ is supplied to each end thereof. The voltage $V_4$ is more positive with respect to the voltage $V_3$ to cause the electrons to travel toward the ends of the element 38. As was the case with FIG. 4, the electrons are collected by means of funnel devices 40, 44 and amplified by means of the electron multiplier elements 30, 46.

The coatings provided on the various elements described in conjunction with FIGS. 1 to 5 may be selected from the group consisting of nickel, cesium iodide, gold or other suitable photocathode materials or the coating may be of the type that would react to produce secondary electrons upon the impact of a charged particle. Also, other shapes of the elements may be utilized to accomplish the same results described above.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

Having thus described by invention, I claim:

1. Apparatus for detecting radiation and charged particles comprising:

a longitudinal electron multiplier, a first coating of conductive and electron emissive material on the entire interior surface of said multiplier;

an input aperture communicating with the interior of said multiplier and extending substantially the full longitudinal dimension of said multiplier and having a transverse dimension at least an order of magnitude less than said longitudinal dimension;

funnel means congruent to said input aperture and communicating with said input aperture, said funnel means comprising plates having input edges and output edges, said output edges being positioned adjacent said input aperture and spaced one from the other, the spacing between said input edges being greater than the spacing between said output the interior of said funnel means having a second coating of conductive and electron emissive material in communication with said first coating;

output means in communication with said electron multiplier;

and biasing means for accelerating charged particles through said multiplier toward said output means.

2. The apparatus of claim 1 wherein said output edges are of a length at least as great as the longitudinal dimension of said input aperture.

3. The apparatus of claim 2 further including means for establishing electrostatic fields for driving secondary electrons emitted from said plate emissive surfaces toward said channel element emissive surface.

4. Apparatus of claim 1 wherein said output means is interposed between the ends of said electron multiplier and said biasing means establishes an electric field which causes charged particles to travel toward said output means.

5. The apparatus of claim 4 wherein said output means comprises a channel multiplier having one end contiguous with said electron multiplier and has a nonlinear axis.

6. The apparatus of claim 5 wherein said funnel means includes first and second conductive surface connected to biasing means to minimize potential well buildup.

7. The apparatus of claim 5 wherein said channel element axis is curved.

8. The apparatus of claim 1 wherein said output means is positioned adjacent one end of said electron multiplier.

9. The apparatus of claim 8 further including a second output means at the other end of said electron multiplier.

10. The apparatus of claim 8 wherein said output means is a first channel multiplier.

11. The apparatus of claim 10 wherein said first and second output means are channel multipliers having nonlinear axes for minimizing feedback effects.

* * * * *